(No Model.)

C. A. SCHEFFLER.
SEWER GAS CHECK.

No. 294,511. Patented Mar. 4, 1884.

WITNESSES:
Addy Heiss
J. S. Huey

INVENTOR.
Charles A. Scheffler
BY G. L. Chapin
ATTORNEY.

UNITED STATES PATENT OFFICE.

CHARLES ANDREW SCHEFFLER, OF CHICAGO, ILLINOIS, ASSIGNOR TO HIMSELF AND SAMUEL H. ADAMS, OF SAME PLACE.

SEWER-GAS CHECK.

SPECIFICATION forming part of Letters Patent No. 294,511, dated March 4, 1884.

Application filed April 17, 1883. (No model.)

*To all whom it may concern:*

Be it known that I, CHARLES A. SCHEFFLER, of Chicago, in the county of Cook and State of Illinois, have invented new and useful Improvements in Sewer-Gas Checks, of which the following is a specification, reference being had to the accompanying drawings, illustrating the invention, in which—

Figure 1:
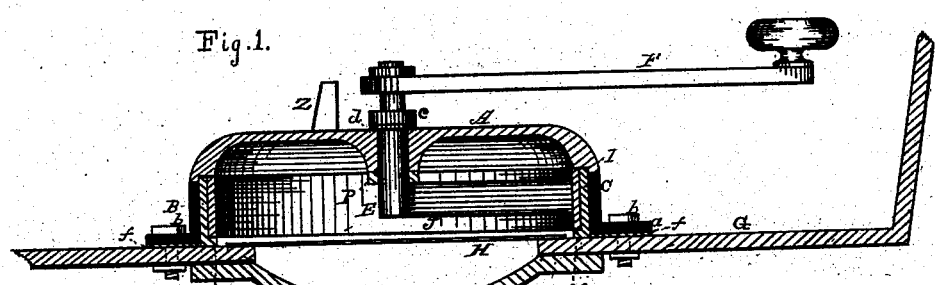
Figure 2:
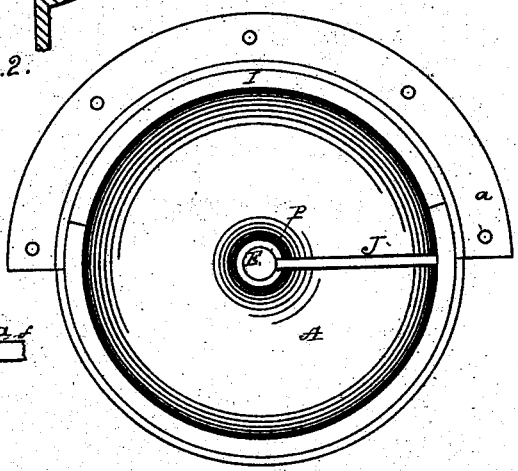
Figure 3:
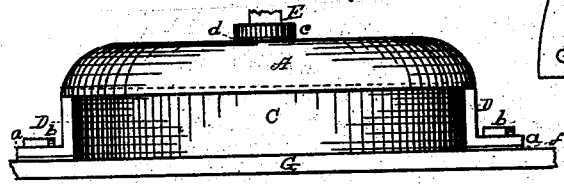
Figure 4:
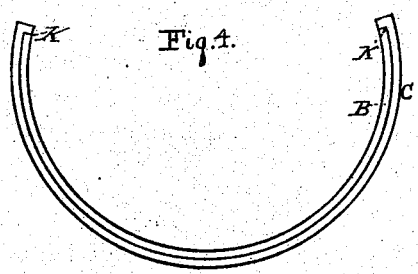

Figure 1 is a vertical central sectional elevation of a mechanism embodying my invention as attached to a sink; Fig. 2, an inverted view of Fig. 1, with the lever removed and the device removed from the sink; Fig. 3 an elevation of Fig. 1 with the lever removed; Fig. 4, a top or plan of the gate and its packing removed from the other mechanism.

The object of the present invention is to provide simple and effectual means for shutting off sewer-gas at sinks, wash-bowls, bathtubs, and other pipe opening or leading to the sewers.

The nature of the invention consists in a case which is made circular in form and with an opening extending round to about one-half of its periphery. Above the opening is formed an annular seat for the edge of a segment-gate to slide on, the lower edge of the gate sliding on the sink. The gate is faced on its convex side and lower edge with rubber, so as to form gas-tight seats against the case and sink bottom. The gate is opened and closed by an arm attached thereto and to a central post, which has a bearing in the case, and is turned by a lever at the outside thereof.

It is proper to state that in order rapidly to empty sinks of water it is the custom to form large openings in their bottoms, and cover such openings with perforated metal screens, which cannot be stopped with the ordinary plug stopper; hence the necessity of resorting to some suitable means which will shut off the escaping gas when water is not running down the waste-pipe, and which shall not obstruct the escape of water nor hold any in the sink. To this end I have constructed what I term a "gate," whose lower guide or seat is the face of the bottom plate of the sink, so that when the gate is open the water is free to discharge and not be obstructed by any rim or flange.

One method of operating this gate is represented in the drawings, a description of which is as follows:

A represents a non-corrosive metal case, which is cut away to near its center, as shown at D D, Fig. 3, to provide an opening for water to pass through. The side of the case not cut away is provided with a flange, a, which, by means of bolts b and rubber f, is firmly clamped to the sink-bottom G.

A suitable distance above the opening D D, and on the inside of the case, is formed an annular seat or guide, as shown at I, Figs. 1 and 2, for the upper edge of the gate B C to slide on. This gate is formed of a segment-strip of metal, B, somewhat smaller than the inside of the concave gate-guide, in order that a strip of rubber may be placed on the convex side of the gate and cover its lower edge, as shown, that there may be a gas-tight bearing against the sink-bottom G and the case A. The best form to cast the rubber for this purpose is to form a flange on the inside of its bottom part, as shown at x x, Fig. 1, and flanges K K on its ends, as shown at Fig. 4. The gate or metal part thereof, B, then has four bearings against the rubber, and it will stay in place by rivets put through its ends, and operate with but little friction. The post E has a proper bearing in the case, and is made gas-tight by rubbers d P, Fig. 1. The arm J is made rigid to the post and to the segment-gate B, and the lever F is made fast to the top thereof, whereby when the lever be turned the gate B C will be opened or closed, as the case may be. A stop, Z, may project up from the top of the case to control the movement which the lever may have, that it may be known when the gate is opened or closed.

The waste-pipe is shown at W.

This form of the case is found very convenient, and to take the least metal of any within my knowledge; but the shape thereof may be changed and my invention be retained, providing the gate has a lower seat on the sink-bottom.

Having thus described my invention, what I claim, and desire to secure by Letters Patent of the United States, is—

In sewer-gas checks, the case A, provided with the semicircular flange $a$, an opening, D, and an annular seat, I, in combination with the sliding gate B C, post E, and lever F, the gate having an upper bearing on the guide I, a bearing on the vertical part of the case, and a lower bearing on the sink-bottom, as specified.

CHARLES ANDREW SCHEFFLER.

Witnesses:
G. L. CHAPIN,
J. S. HUEY.